United States Patent

Shimanaka et al.

[11] Patent Number: 6,138,070
[45] Date of Patent: Oct. 24, 2000

[54] CONTROLLER FOR A CONTINUOUSLY VARIABLE TRANSMISSION

[75] Inventors: Shigeki Shimanaka, Hadano; Toshiji Iida, Sagamihara, both of Japan

[73] Assignee: Nissan Motor Co., Ltd., Yokohama, Japan

[21] Appl. No.: 09/132,767

[22] Filed: Aug. 12, 1998

[30] Foreign Application Priority Data

Aug. 12, 1997 [JP] Japan ..................................... 9-217817

[51] Int. Cl.[7] .......................... G06F 17/00; G06F 19/00; G06F 7/00
[52] U.S. Cl. ................................ 701/51; 701/52; 701/61; 701/79; 477/15; 477/905
[58] Field of Search ................................. 701/51, 52, 53, 701/54, 61, 66, 79, 87, 93, 110; 477/14, 15, 905; 474/70

[56] References Cited

U.S. PATENT DOCUMENTS

| | | | |
|---|---|---|---|
| 5,233,523 | 8/1993 | Follmer | 701/51 |
| 5,383,812 | 1/1995 | Tibbles | 474/28 |
| 5,984,829 | 11/1999 | Minagawa et al. | 477/98 |

FOREIGN PATENT DOCUMENTS 8-74958  3/1996  Japan.

Primary Examiner—Tan Nguyen
Assistant Examiner—Gertrude Arthur
Attorney, Agent, or Firm—Foley & Lardner

[57] ABSTRACT

A controller for a continuously variable transmission of a vehicle sets a command speed ratio so that a real speed ratio approaches a target speed ratio which is set according to running conditions including throttle opening. When an upshift is performed, this controller determines, from the variation of throttle opening, whether the upshift is due to a decrease in throttle opening or whether it is another type of upshift. When it is determined that the upshift is due to throttle opening decrease, a response rate of the command speed ratio relative to the target speed ratio immediately after start of speed change is temporarily increased, and subsequently slowly decreased.

7 Claims, 10 Drawing Sheets

CONTROLLER FOR A CONTINUOUSLY VARIABLE TRANSMISSION

FIELD OF THE INVENTION

The present invention relates to a controller for a continuously variable transmission for a vehicle.

BACKGROUND OF THE INVENTION

A controller for a continuously variable transmission (CVT) for a vehicle disclosed in Tokkai Hei 8-74958 published by the Japanese Patent Office in 1996 sets a target speed ratio according to running conditions including a throttle opening, and controls the CVT so that the real speed ratio follows the target speed ratio.

This controller distinguishes between an auto upshift wherein the throttle opening is in an effectively constant state, upshift due to a decrease in degree of throttle opening, and downshift due to an increase in degree of throttle opening, based on a comparison of the target speed ratio with a real speed ratio and a variation of throttle opening. Based on the result of this distinction, a speed change response is changed.

When the speed change response is low in auto upshift, there is a possibility that the approach of the real speed ratio to the target speed ratio will be delayed, and engine rotation speed will rise excessively, and when the speed change response is high during upshift due to throttle opening decrease, the vehicle accelerates even though the accelerator pedal is returned, and gives an uncomfortable feeling to the driver.

Therefore, in this prior art device, the speed change response in upshift due to throttle opening decrease is set lower than the speed change response in auto upshift.

However, when the speed change response is set low like this, if the accelerator pedal is released from the substantially fully open state, there is a possibility that a deceleration shock will occur immediately after upshift starts. For example, when the accelerator pedal is depressed and the throttle opening is large, the real speed ratio increases together with engine rotation speed, and when the foot is released from the accelerator pedal in this state, fuel cut begins. If the speed change response is slow at this time, a deceleration shock occurs.

SUMMARY OF THE INVENTION

It is therefore an object of this invention to prevent deceleration shock when a driver releases or returns an accelerator pedal when a throttle opening is large or engine rotation speed is high.

In order to achieve the above object, this invention provides a controller for a continuously variable transmission of a vehicle which continuously varies a speed ratio comprising sensors for detecting a running state of the vehicle, where the running state includes a throttle opening of an engine with which the vehicle is provided and a microprocessor programmed to set a target speed ratio according to the running state, and control a speed ratio of the transmission to be equal to the target speed ratio at a predetermined response rate. The microprocessor is further programmed to distinguish between an upshift due to a throttle opening decrease and other upshifts, set the response rate during the upshift due to the throttle opening decrease to be lower than a response rate during the other upshifts, and set the response rate in a predetermined time from start of upshift due to the throttle opening decrease to be higher than a response rate after the predetermined time from start of upshift has elapsed.

According to an aspect of this invention, the microprocessor is further programmed to determine that the upshift due to the throttle opening decrease is performed when the throttle opening has decreased from a value which is larger than or equal to a predetermined value.

According to another aspect of this invention, the sensors comprise a sensor for detecting an engine rotation speed, and the microprocessor is further programmed to determine that the upshift due to the throttle opening decrease is performed when the throttle opening has decreased from a value which is larger than or equal to a predetermined value and said engine rotation speed is larger than or equal to a predetermined value.

According to another aspect of this invention, the sensors further comprise a sensor for detecting an input shaft rotation speed of the transmission and a sensor for detecting a vehicle speed, and the microprocessor is further programmed to determine a control value according to the throttle opening and vehicle speed, and determine that the upshift due to the throttle opening decrease is performed when a variation rate of the input shaft rotation speed is less than the control value.

According to yet another aspect of this invention, the microprocessor is further programmed to increase the control value with increases in the throttle opening, and to increase the control value with decreases in the vehicle speed.

According to yet another aspect of this invention, the microprocessor is further programmed to compute a command speed ratio based on a target speed ratio and a predetermined time constant, control the speed ratio of the transmission to be equal to the command speed ratio, set the time constant to be larger during the upshift due to the throttle opening decrease than a time constant during the other upshifts, and set a time constant in a predetermined time from start of the upshift due to the throttle opening decrease to be smaller than a time constant after the predetermined time from start of upshift has elapsed.

According to yet another aspect of this invention, the microprocessor is further programmed to compute a command speed ratio based on a target speed ratio and a predetermined time constant, control the speed ratio of the transmission to be equal to the command speed ratio, set the time constant to be larger during the upshift due to the throttle opening decrease than a time constant during the other upshifts, and limit a variation amount of the time constant for predetermined time after start of speed change when a change-over is made to a time constant during the upshift due to the throttle opening decrease from a time constant during the other upshifts.

The details as well as other features and advantages of this invention are set forth in the remainder of the specification and are shown in the accompanying drawings.

DESCRIPTION OF THE PREFERRED EMBODIMENTS

Figure 1:
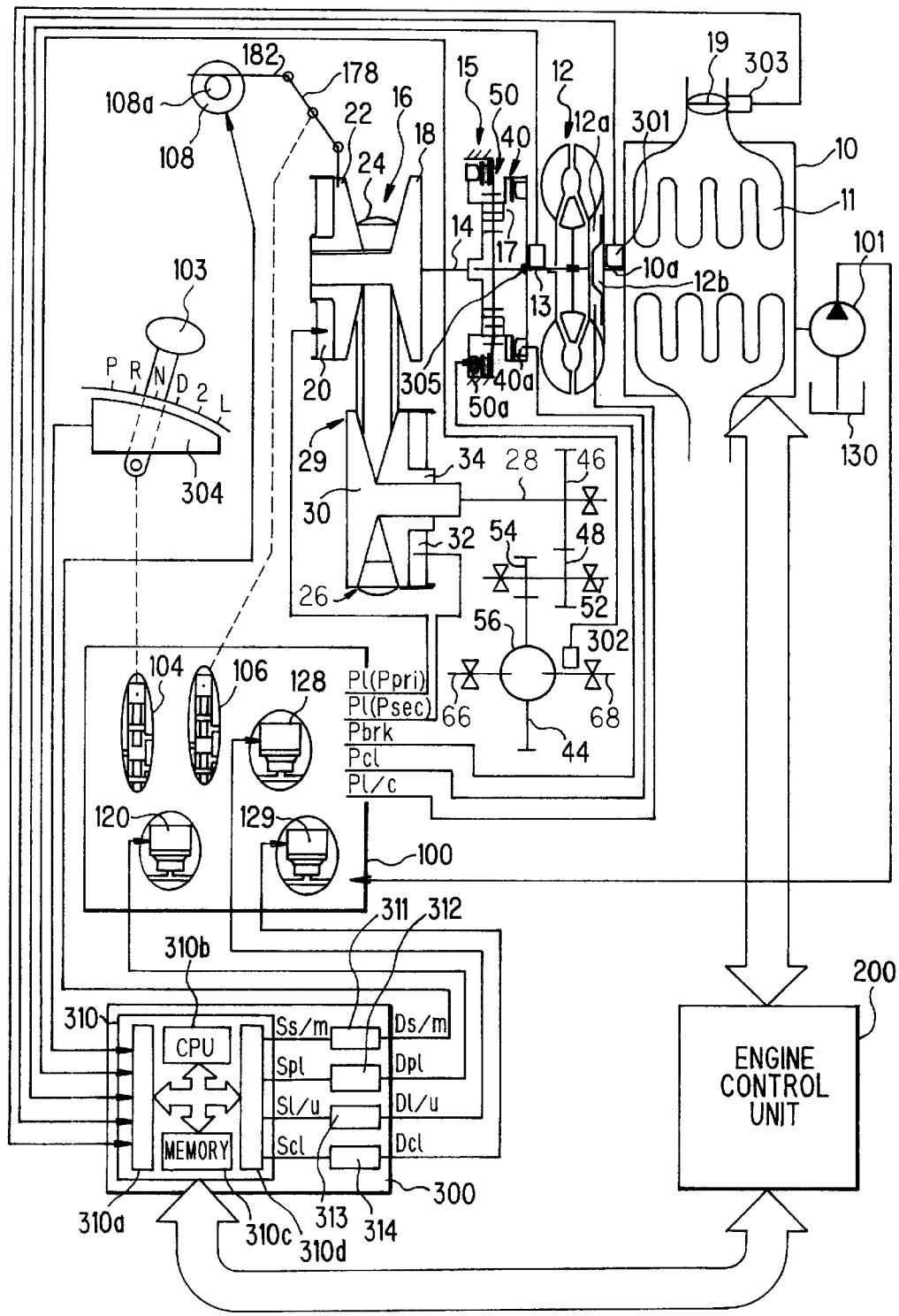
FIG. 1 is a schematic diagram of a controller of a continuously variable transmission according to this invention.

Referring to FIG. 1 of the drawings, a Continuously Variable Transmission (CVT) 29 is connected to an output shaft 10a of an engine 10 via a forward/reverse change-over mechanism 15 and a torque converter 12. The CVT 29 is connected to drive shafts 66, 68 via a differential gear unit 56.

A throttle valve 19 which opens and closes according to the degree of an accelerator pedal depression, is provided in an inlet pipe 11 of the engine 10. A throttle opening sensor 303 which detects a throttle opening TVO is fitted to the throttle valve 19. An engine rotation speed sensor 301 which detects an engine rotation speed $N_e$ is attached to the output shaft 10a of the engine 10.

The torque converter 12 connected to the output shaft 10a of the engine 10 is provided with a conventional lock-up mechanism. An input shaft rotation speed sensor 305 which detects an input shaft rotation speed $N_{pri}$ of the CVT 29 is installed near to an output shaft 13 of the torque converter 12, The forward/reverse change-over mechanism 15 is provided with a planetary gear mechanism 17, forward clutch 40 and reverse brake 50.

A drive pulley 16 of the CVT 29 is provided with a fixed conical plate 18 which rotates together with an input shaft 14, and a movable conical plate 22 facing the fixed conical plate 18 and which can displace in an axial direction. A V-shaped pulley groove is formed between these conical plates 18, 22.

To displace the movable conical plate 22 in the axial direction and to grip a belt 24 between these conical plates 18, 22, the CVT 29 is provided with a pressure chamber 20 for exerting oil pressure on the conical plate 22.

A driven pulley 26 which forms a pair with the drive pulley 16, comprises a fixed conical plate 30 which rotates together with an output shaft 28, and a movable conical plate 34 arranged facing the fixed conical plate 30 which can displace in an axial direction. A V-shaped pulley groove is formed between these conical plates 30, 34.

To displace the movable conical plate 34 in the axial direction and to grip the belt 24 between these conical plates 30, 34, the CVT 29 is provided with a pressure chamber 32 for exerting oil pressure on the conical plate 34. The belt 24 is looped around the V-shaped grooved of the drive pulley 16 and driven pulley 26.

A pinion 108a which engages with a rack 182 is installed on the rotation shaft of a stepping motor 108. Further, the rack 182 and the movable conical plate 22 of the drive pulley 16 are connected by a lever 178.

When the stepping motor 108 rotates according to a drive signal $D_{s/m}$ from a transmission control unit 300 described hereafter, the movable conical plate 22 of the drive pulley 16 and movable conical plate 34 of the driven pulley 26 move in the axial direction. As a result, the contact position radii of the belt 24 with the grooves vary, and the rotation ratio of the drive pulley 16 and driven pulley 26, i.e. the speed ratio, varies.

An inhibitor switch 304 is fitted to a select lever 103, this switch detecting a select lever position and outputting a select lever position signal $S_{RANGE}$ to the CVT control unit 300.

A pump 101 driven by the engine 10 pressurizes the hydraulic fluid in a reservoir tank 130, and supplies it to a hydraulic control unit 100.

The hydraulic control unit 100 is provided with a manual valve 104, speed ratio control valve 106, duty valve 120 for line pressure control, duty valve 128 for lockup control, and duty valve 129 for clutch engaging control.

The manual valve 104 is operated directly by the select lever 103, and changes over between supply of a line pressure $P_d$ to a pressure chamber 40a of a forward clutch 40 and supply of a brake pressure $P_{brk}$ to a pressure chamber 50a of a reverse brake 50.

The speed ratio control valve 106 controls supply of oil pressure (line pressure) $P_{pri}$ ($P_1$) to the drive pulley 16 according to a relation between the desired speed ratio and the groove width of the drive pulley 16.

The duty valve 120 for line pressure control, controls the oil pressure (line pressure) $P_1$ exerted on the driven pulley 26 and drive pulley 16.

The duty valve 128 for lockup control, controls lock/unlock of a lock-up mechanism of the torque converter 12.

The duty valve 129 for clutch engaging control, controls the engaging force of the forward clutch 40 and reverse brake 50.

The CVT control unit 300 comprises a microcomputer 310 and drive circuits 311–314.

The microcomputer 310 outputs a control signal to the drive circuits 311–314 to control the CVT 29 and the hydraulic control unit 100. The drive circuits 311–314 convert the control signal input from the microcomputer 310 into drive signals for the stepping motor 108 and duty valves 120, 128, 129.

The microcomputer 310 is provided with an input interface circuit 310a having an A/D conversion function, a Central Processing Unit (CPU) 310b, a memory 310c comprising a ROM and RAM, and an output interface circuit 310d having a D/A conversion function.

Based on the engine load represented by the throttle opening TVO, engine rotation speed $N_e$ and vehicle speed VSP, the stepping motor 108 is driven by the drive signal $D_{s/m}$ output from the drive circuit 311 so that the CVT 29 changes speed ratio according to a preset shift map, and the line pressures supplied to the cylinder chamber 20 of the drive pulley 16 and the cylinder chamber 32 of the driven pulley 20 increase and decrease relative to each other as a result.

The displacement of the drive pulley 16, i.e. the speed ratio, is fed back to the speed ratio control valve 106 as a behavior of the lever 178. Due to this, the oil pressure distribution to the cylinder chambers 20, 32 becomes constant at a speed ratio according to the position of the stepping motor 108, and the real speed ratio stabilizes when it becomes equal to a command speed ratio.

Figure 2:
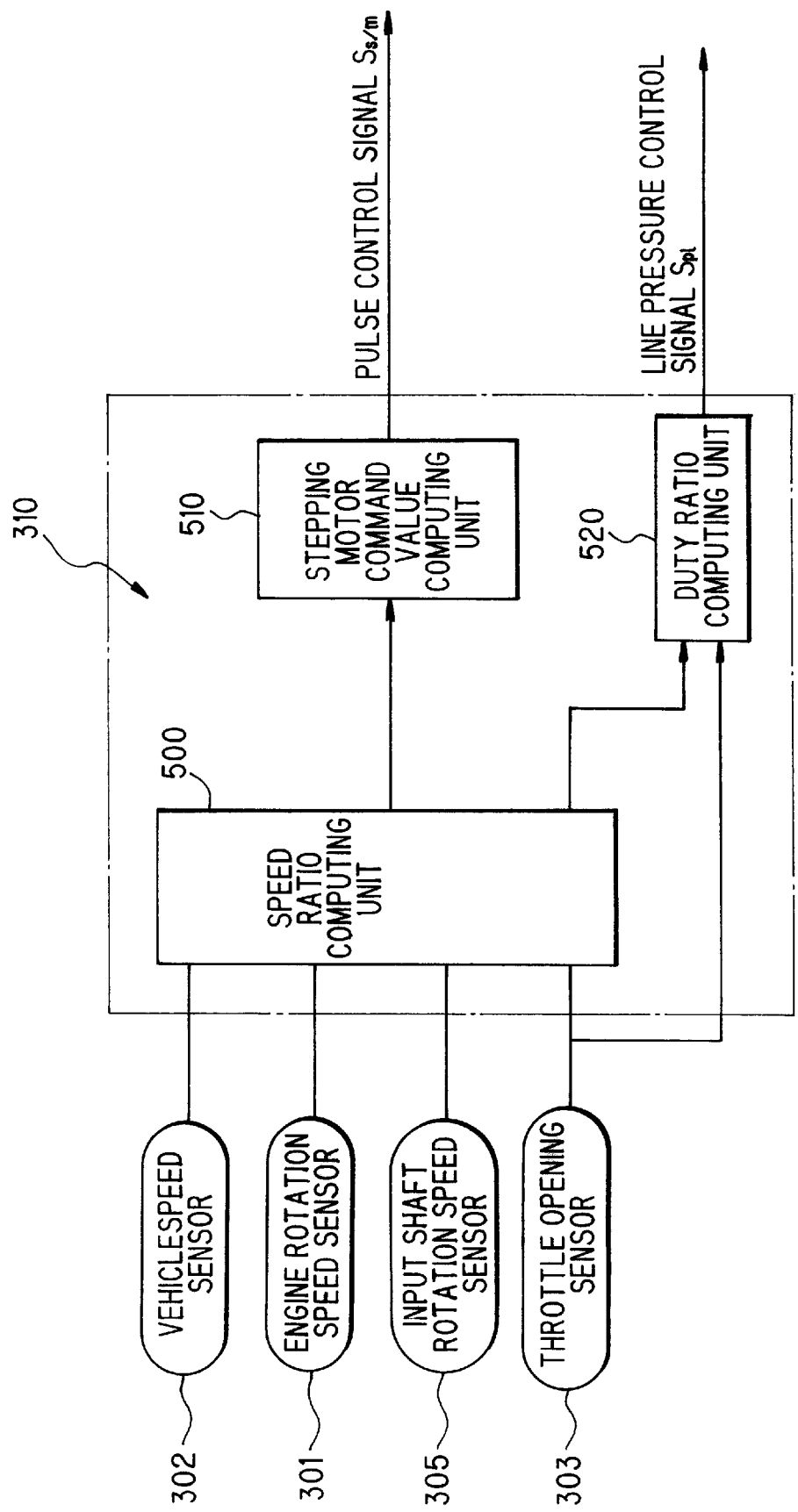
FIG. 2 is a block diagram of a microcomputer of a CVT control unit according to this invention.

Next, the speed ratio control performed by the CVT control unit 300 will be described referring to the block diagram shown in FIG. 2.

The microcomputer 310 of the CVT control unit 300 is provided with a speed ratio computing unit 500, stepping motor command value computing unit 510 and duty ratio computing unit 520.

The speed ratio computing unit 500 computes a target speed ratio $i_{p0}$, command speed ratio $i_{pt}$ and real speed ratio $i_{pr}$ based on the engine rotation speed $N_e$ from the engine rotation speed sensor 301, vehicle speed signal VSP from a vehicle speed sensor 302, and throttle opening signal TVO from the throttle opening sensor 303.

The stepping motor command value computing unit 510 outputs a pulse control signal $S_{s/m}$ to the drive circuit 311 to control the stepping motor 108 based on the command speed ratio $i_{pt}$ and vehicle speed VSP.

The duty ratio computing unit 520 outputs a line pressure control signal $S_{pl}$ to the drive circuit 312 to control the line pressure duty valve 120 based on the real speed ratio $i_{pr}$ and throttle opening TVO.

Next, the speed ratio control process performed by the CVT control unit 300 will be described referring to flow charts of FIG. 3 and FIG. 5.

This speed ratio control process is executed at an interval of a predetermined sampling time $\Delta T$ (for example, 10 msec).

Herein, no steps are particularly provided for communication, but the necessary programs, maps and data are read by the CPU 310b as required from the memory 310c. Conversely, data computed by the CPU 310b is stored as required by the memory 310c.

In a step S1, the vehicle speed signal VSP from the vehicle speed sensor 302, engine rotation speed signal $N_e$ from the engine rotation speed sensor 301, input shaft rotation speed signal $N_{pri}$ from the input shaft rotation speed sensor 305 and the throttle opening signal TVO from the throttle opening sensor 303, are read.

In a step S2, an immediately preceding value $TVO_{-1}$ of the throttle opening, immediately preceding value $i_{p0-1}$ of the target speed ratio, immediately preceding value $i_{pt-1}$ of the command speed ratio, and immediately preceding value $\tau_{-1}$ of a time constant, and immediately preceding value $N_{pri-1}$ of the input shaft rotation speed, are read.

In a step S6, the real speed ratio $i_{pr}$ is computed from the vehicle speed VSP and input shaft rotation speed $N_{pri}$. Specifically, the vehicle speed VSP is multiplied by a constant $K_S$ so as to compute an output shaft rotation speed $N_{sec}$ of the CVT 29, and the ratio of the input shaft rotation speed $N_{pri}$ relative to the output shaft rotation speed $N_{sec}$ is computed so as to determine the real speed ratio $i_{pr}$.

Figure 4:
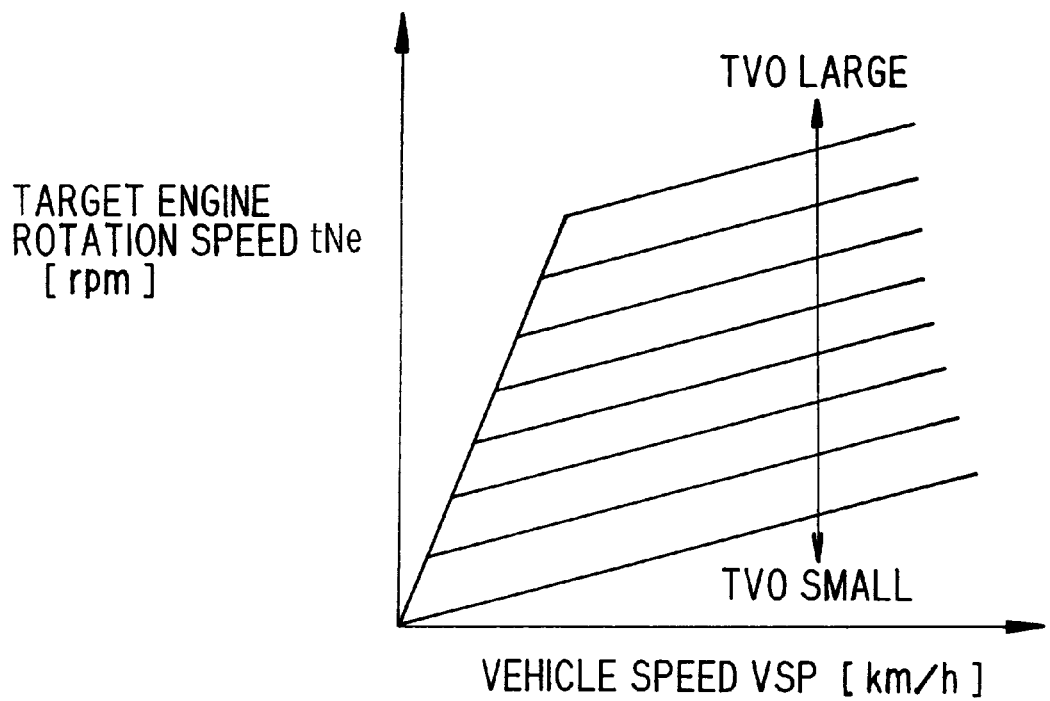
FIG. 4 is a map stored in the CVT control unit for computing a target engine rotation speed from a vehicle speed and throttle opening.

In a step S7, reference is made to a map shown in FIG. 4 to compute a target engine rotation speed $tN_e$ from the current vehicle speed VSP and throttle opening TVO.

In a step S8, the vehicle speed VSP is multiplied by the constant $K_S$ to compute the output shaft rotation speed $N_{sec}$ of the CVT 29.

The routine proceeds to a step S9 where the target engine rotation speed $tN_e$ is divided by the output shaft rotation speed $N_{sec}$ of the CVT 29 to compute the target speed ratio $i_{p0}$ of the CVT 29.

The routine proceeds to a step S10 where a speed ratio deviation $e_{ip}$ between the target speed ratio $i_{p0}$ and the immediately preceding value $i_{pt-1}$ of the command speed ratio is computed.

The routine proceeds to a step S11 where the target speed ratio $i_{p0}$ and real speed ratio $i_{pr}$ are compared. If the target speed ratio $i_{p0}$ is less than the real speed ratio $i_{pn}$ it is determined that an upshift is performed, and the routine proceeds to a step S12. If the target speed ratio $i_{p0}$ is equal to or larger than the real speed ratio $i_{pn}$ it is determined that an upshift is not performed, and the routine proceeds to a step S13.

In the step S13, a time constant $\tau_0$ is set to determine the dynamic characteristics of the command speed ratio $i_{pt}$ in a downshift. To increase the speed change response in a downshift, a small time constant $\tau_2$ is input to the time constant $\tau_0$.

In a step S14, a control flag F is set to "0". The time constant $\tau_2$ set on this occasion is stored as the immediately preceding value $\tau_{-1}$, the present value TVO of the throttle opening is stored as the immediately preceding value $TVO_{-1}$ in the memory 310c, and the routine proceeds to a step S15.

On the other hand, in the step S12 where it is determined that upshift is performed, a deviation between the present value TVO of the throttle opening and the value $TVO_{-t}$ on the immediately preceding occasion, is compared with a threshold value $\Delta TVO$. When the deviation of throttle opening is larger than the threshold value $\Delta TVO$, it is determined that the opening variation of the throttle valve 19 is large and the routine proceeds to a step S16. When the deviation of throttle opening is less than the threshold value $\Delta TVO$, it is determined that the opening variation of the throttle valve 19 is small, and the routine proceeds to a step S17.

The routine proceeds from the step S12 to the step S16 when the throttle opening TVO varies in the closing direction due to the driver releasing his foot from or returning it to the accelerator pedal, and an upshift is performed due to the decrease of throttle opening.

In the step S17 to which the routine proceeds when it is determined in the step S12 that the opening variation of the throttle valve 19 is small, the deviation between the present value $i_{p0}$ of the target speed ratio and the value $i_{p0-1}$ on the immediately preceding occasion is compared with a threshold value $\Delta i_{p0}$. When the deviation of the target speed ratio is smaller than the threshold value $\Delta i_{p0}$, it is determined that an upshift is being performed wherein the opening of the throttle valve 19 is maintained substantially constant and the target speed ratio $i_{p0}$ gradually varies with increase of vehicle speed VSP, and the routine proceeds to a step S18. When the deviation of target speed ratio is larger than the threshold value $\Delta i_{p0}$, the routine proceeds to the step S16.

In the step S18, the time constant $\tau_0$ is set to determine the dynamic characteristic of the command speed ratio $i_{pt}$ which makes the real speed ratio $i_{pr}$ coincide with the present value $i_{p0}$ of the target speed ratio during auto upshift. In order to increase the speed change response in auto upshift, this time constant $\tau_0$ is set to a small value $\tau_t$. The routine then proceeds to a step S19, the control flag F is set to "0", the time constant $\tau_t$ which was set on the present occasion is stored as an immediately preceding value $\tau_{-t}$, the present value TVO of the throttle opening is stored as an immediately preceding value $TVO_{-1}$ in the memory 310c, and the routine proceeds to the step S15.

In the step S15, the command speed ratio $i_{pt}$ having a first order delay relative to the target speed ratio $i_{p0}$ is computed by equation (1) from the target speed ratio $i_{p0}$ and time constant $\tau_0$.

$$i_{pt}=i_{pr}+(i_{p0}-i_{pr})/(s\tau_0+1) \quad (1)$$

where s=differential operator

In a step S20, the present value $i_{p0}$ of the target speed ratio is stored as the immediately preceding value $i_{p0-1}$, and the input shaft rotation speed $N_{pri}$ is stored as an immediately preceding value $N_{pri-1}$ in the memory 310c.

In a step S21, the pulse control signal $S_{s/m}$ is computed according to the command speed ratio $i_{pt}$ which was computed in the step S15, and in a step S22, the pulse control signal $S_{s/m}$ is output to the drive circuit 311.

Next, a process for setting the time constant in an upshift due to the throttle opening decrease performed in the step S16 will be described referring to the flowchart of FIG. 5.

First, in a step S30, it is determined whether or not the control flag F "0". When the control flag F is "0", the routine proceeds to a step S32, and when it is not "0" the routine proceeds to a step S48.

In the step S32, it is determined whether or not the present value TVO of the throttle opening is "0". When the throttle opening TVO is "0", the routine proceeds to a step S34, and when it is not "0" the routine proceeds to a step S36.

Figure 6:
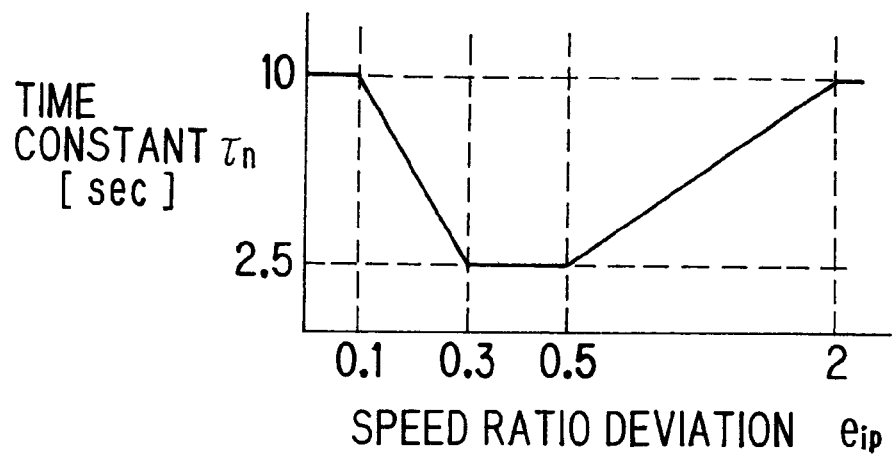
FIG. 6 is a map stored in the CVT control unit specifying a relation between speed ratio deviation and the time constant in upshift when an accelerator pedal is released.

In the step S34, a time constant $\tau_n$ according to the speed ratio deviation $e_{ip}$ is computed referring to a map shown in FIG. 6, and the routine proceeds to a step S38. The time constant $\tau_n$ computed referring to the map of FIG. 6 is larger than the time constant $\tau_1$ in auto upshift and the time constant $\tau_2$ in downshift.

Figure 7:
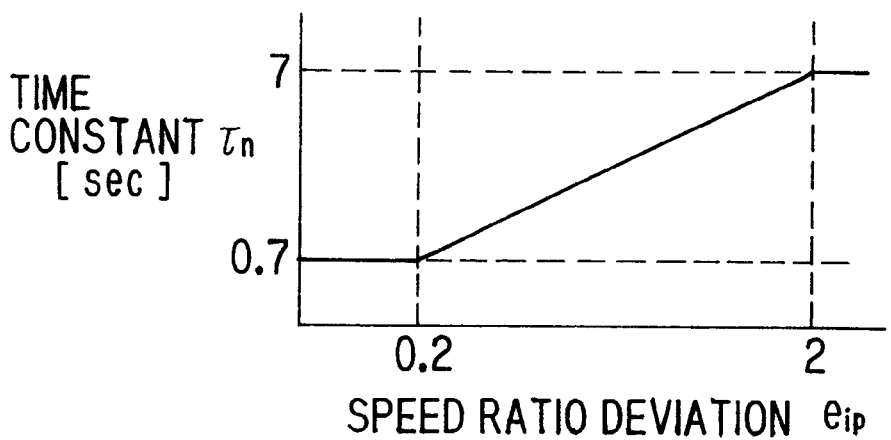
FIG. 7 is a map stored in the CVT control unit specifying a relation between speed ratio deviation and the time constant in upshift when the accelerator pedal is returned to a midway position.

In the step S36, the time constant $\tau_n$ according to the speed ratio deviation $e_{ip}$ is computed referring to a map shown in FIG. 7, and the routine proceeds to the step S38. The time constant $\tau_n$ computed referring to the map of FIG. 7 is larger than the time constant $\tau_1$ in auto upshift and the time constant $\tau_2$ in downshift, but smaller than the time constant $\tau_n$ set in the step S34.

In the step S38, it is determined whether or not the throttle valve 19 before a foot release operation or a foot return operation is nearly full open.

When the immediately preceding value $TVO_{-1}$ of the throttle opening is larger than ⅞, the routine proceeds to a step S40, and when the immediately preceding value $TVO_{-1}$ is smaller than ⅞, the routine proceeds to a step S42.

Figure 3:
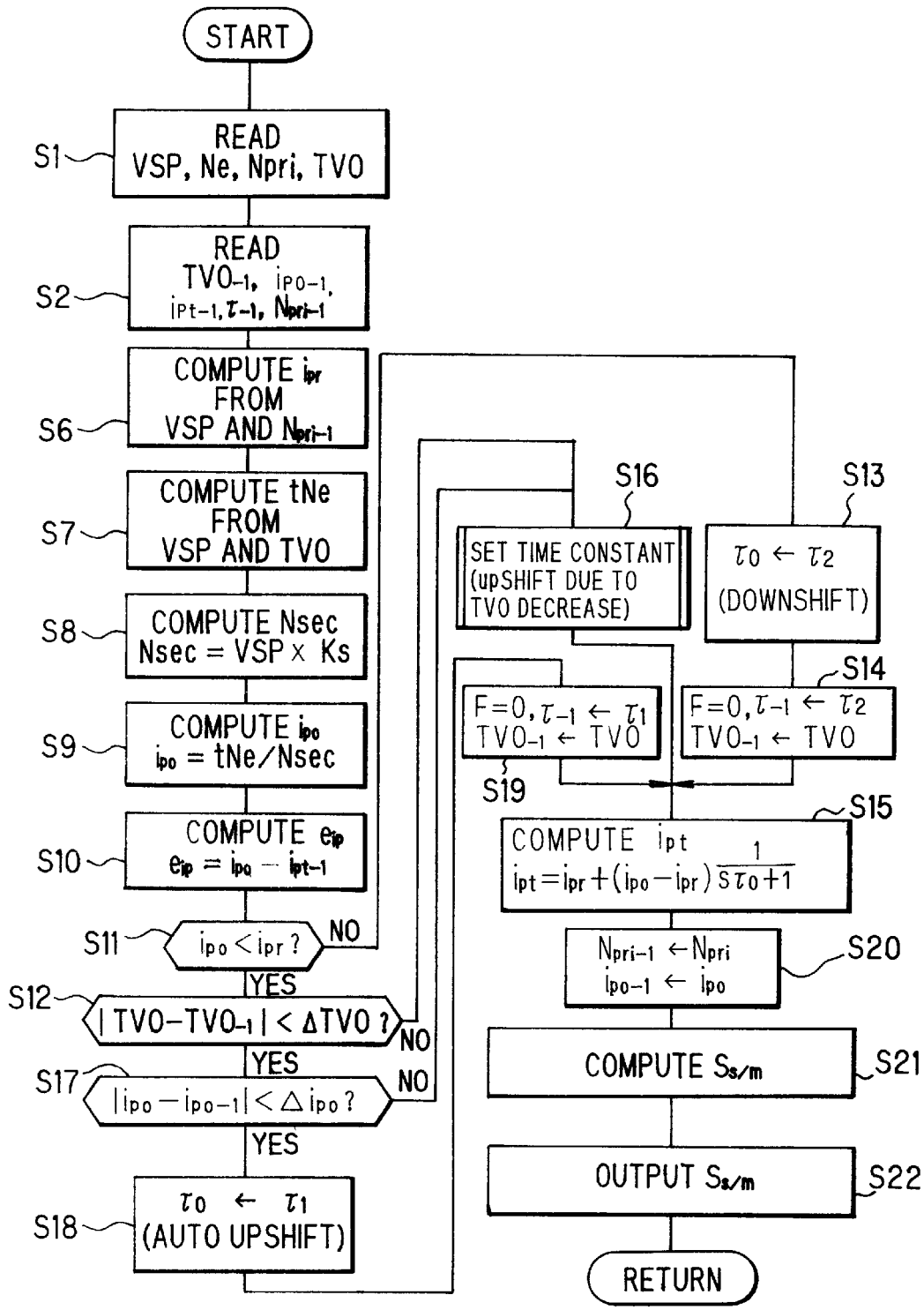
FIG. 3 is a flowchart describing the speed ratio control process performed by the CVT control unit.

In the step S42, the time constant $\tau_n$ computed in the step S34 or step S36 is stored as the time constant $\tau_0$ for computing the command speed ratio $i_{pt}$ and as the immediately preceding value $\tau_{-1}$ of the time constant, and the routine proceeds to the step S15 of FIG. 3.

In the step S40, it is determined whether or not the rotation speed of the engine 10 is high. When the rotation speed $N_e$ of the engine 10 is larger than a threshold value $N_{th}$ (for example 4000 rpm), the routine proceeds to a step S44, and when it is smaller than the threshold value $N_{th}$ the routine proceeds to a step S42.

In the step S44, a control counter CNT is set to a predetermined value $CNT_{max}$, and the routine proceeds to a step S46.

In a step S46, the control flag F is set to "1" and the routine proceeds to a step S50.

In the step S50, the control counter CNT is reduced, and the routine proceeds to a step S52.

In the step S52, it is determined whether or not the control counter CNT is "0" or less. When the control counter CNT is "0" or less, the routine proceeds to a step S54, and when the control counter CNT exceeds "0", the routine proceeds to a step S56.

In the step S54, the present value $\tau_n$ of the time constant computed in the step S34 or step S36 is compared with the immediately preceding value $\tau_{-1}$. When the present value $\tau_n$ is larger than the immediately preceding value $\tau_{-1}$ of the time constant, the routine proceeds to a step S58. When the present value $\tau_n$ is equal to or less than the immediately preceding value $\tau_{-1}$ of the time constant, the routine proceeds to a step S60.

In the step S60, the control flag F is set to "2", and the routine proceeds to the step S42.

In the step S58, a time constant $\tau_b$, which is smaller than $\tau_n$ and of which the variation amount from the immediately preceding value $\tau_{-1}$ of the time constant is limited, is computed by the following equation (2).

$$\tau_b=\Delta\tau_{lim}\times\Delta T+\tau_{-1} \quad (2)$$

where $\Delta\tau_{lim}$=time constant variation rate (sec/sec)

$\Delta T$=sampling time (sec)

In a step S62, the time constant $\tau_b$ is stored as the time constant $\tau_0$ for computing the command speed ratio $i_{pt}$, and as the immediately preceding value $\tau_{-1}$ of the time constant, and the routine proceeds to the step S15 of FIG. 3.

Due to the above process, when the rotation speed of the engine 10 is high and the throttle opening TVO is effectively fully open, and the driver performs an accelerator pedal release or return operation, an upshift is performed. On this occasion immediately after start of speed change, $\tau_b$, which is smaller than $\tau_n$ is set to the time constant $\tau_0$. As a result, the speed change response of the CVT 29 increases, and deceleration shock is prevented.

After a predetermined time has elapsed from start of speed change, $\tau_n$ is set to the time constant $\tau_0$ and the speed change response falls to a low level. The driver therefore also does not suffer an acceleration shock.

Figure 8:
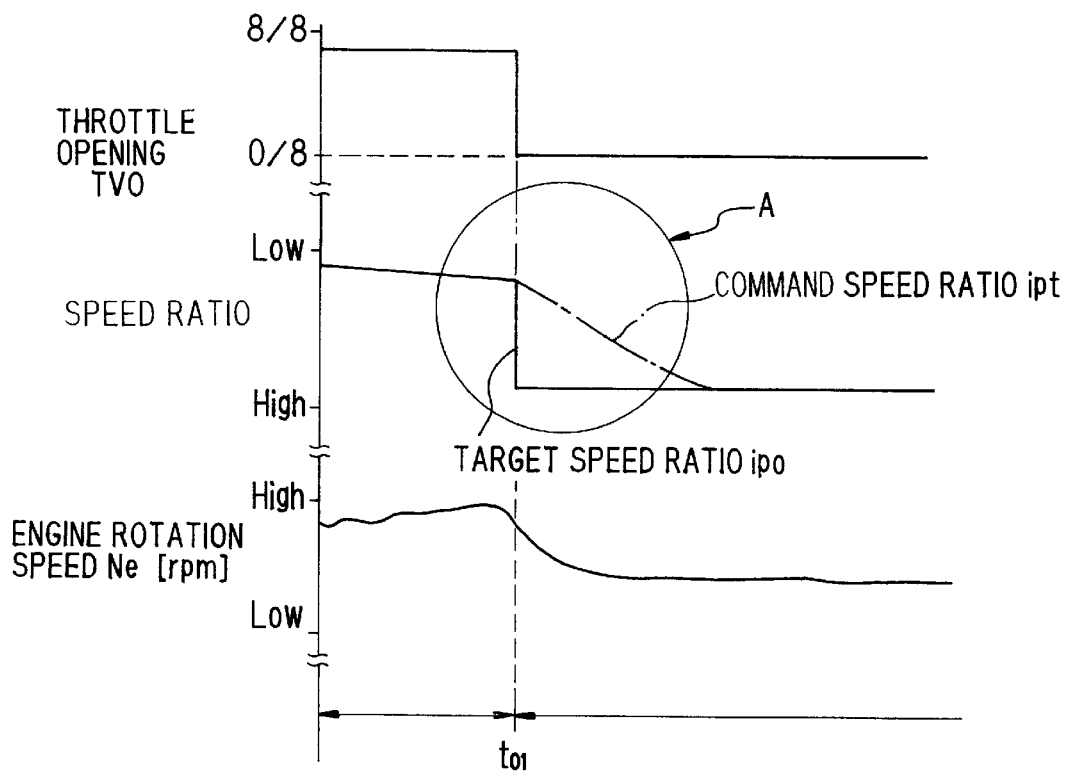
FIG. 8 is a timing chart showing speed ratio control in upshift accompanying throttle opening decrease.
Figure 9:
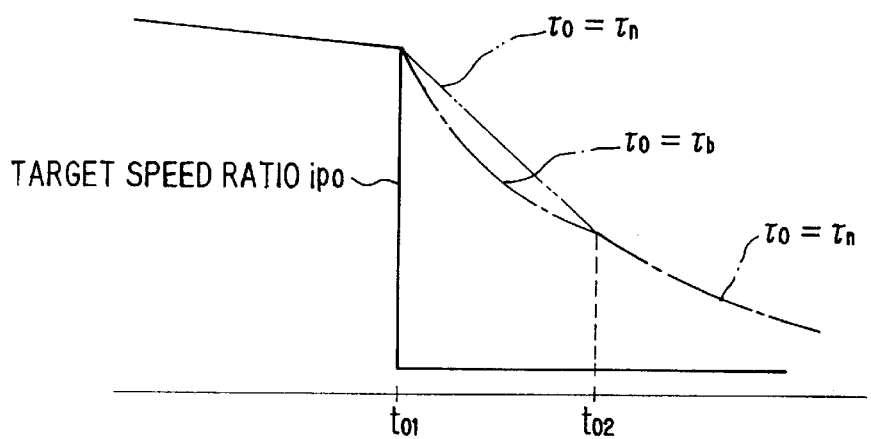
FIG. 9 is a timing chart showing an enlargement of a part A in FIG. 8.

This is shown by the timing charts of FIG. 8 and FIG. 9. FIG. 9 is an enlargement of a part of FIG. 8 shown with by a circle marked A.

When the engine rotation speed is high, and an upshift starts due to a decrease from a large throttle opening, immediately after speed change begins (during an interval from a time $t_{01}$ to a time $t_{02}$), the time constant $\tau_b$ which is smaller than $\tau_n$ is set to the time constant $\tau_0$, and the command speed ratio $i_{pt}$ is computed. Consequently, the command speed ratio $i_{pt}$ follows a curve with a steep slope rapidly tending toward the target speed ratio $i_{p0}$ as shown by a dot and dash line, and as the speed change response of CVT 29 increases, deceleration shock immediately after upshift due to throttle opening decrease is prevented.

From a time $t_{02}$ after a time corresponding to the predetermined value $CNT_{max}$, $\tau_n$ which is larger than the $\tau_b$ is set to the time constant $\tau_0$, and the command speed ratio $i_{pt}$ is computed. Due to this, the command speed ratio $i_{pt}$ follows a gradual slope and the speed change response gradually falls, so an acceleration shock is not given to the driver.

Figure 10:
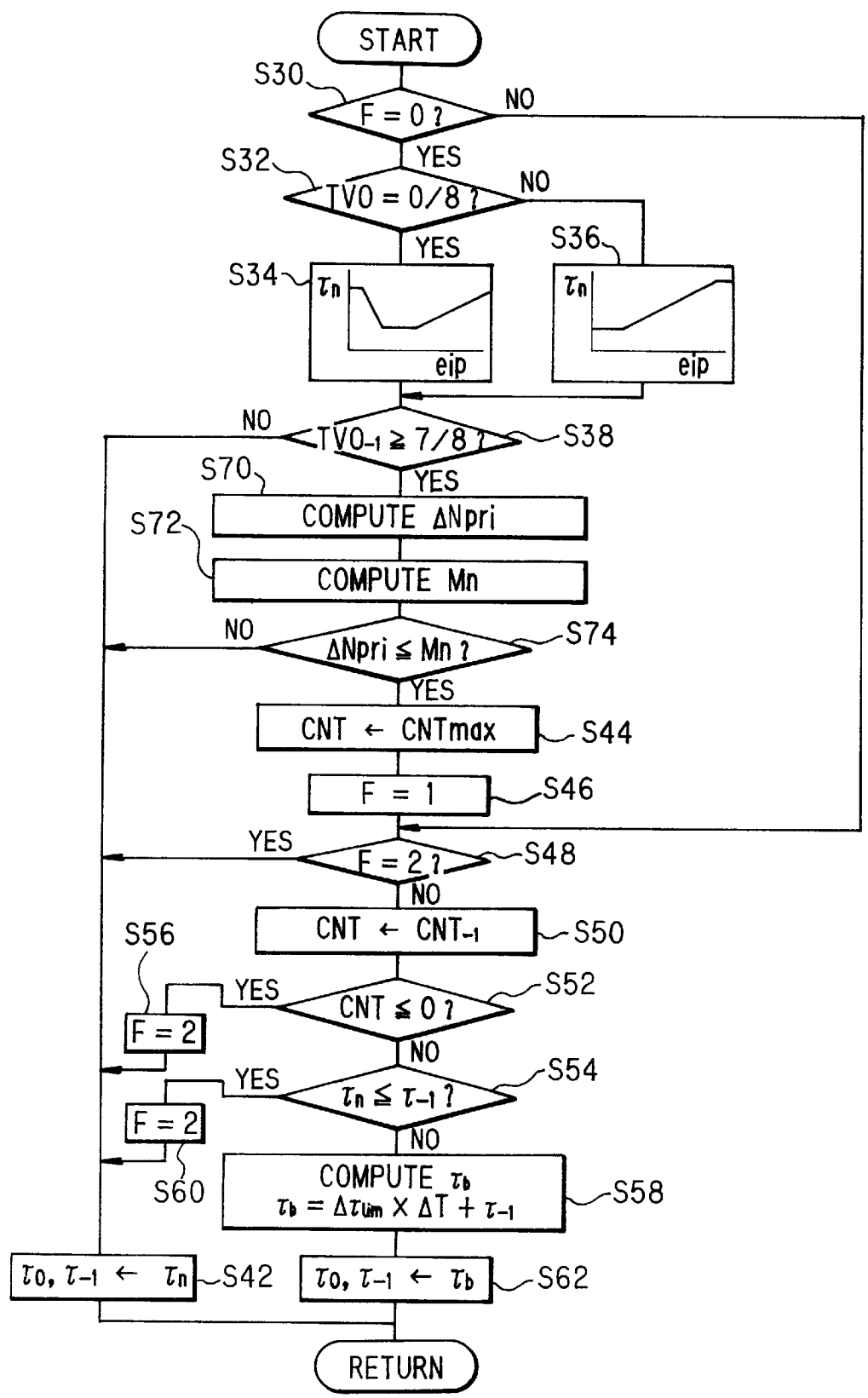
FIG. 10 is similar to FIG. 5, but showing a second embodiment of this invention.

FIG. 10 shows a second embodiment of this invention.

Figure 5:
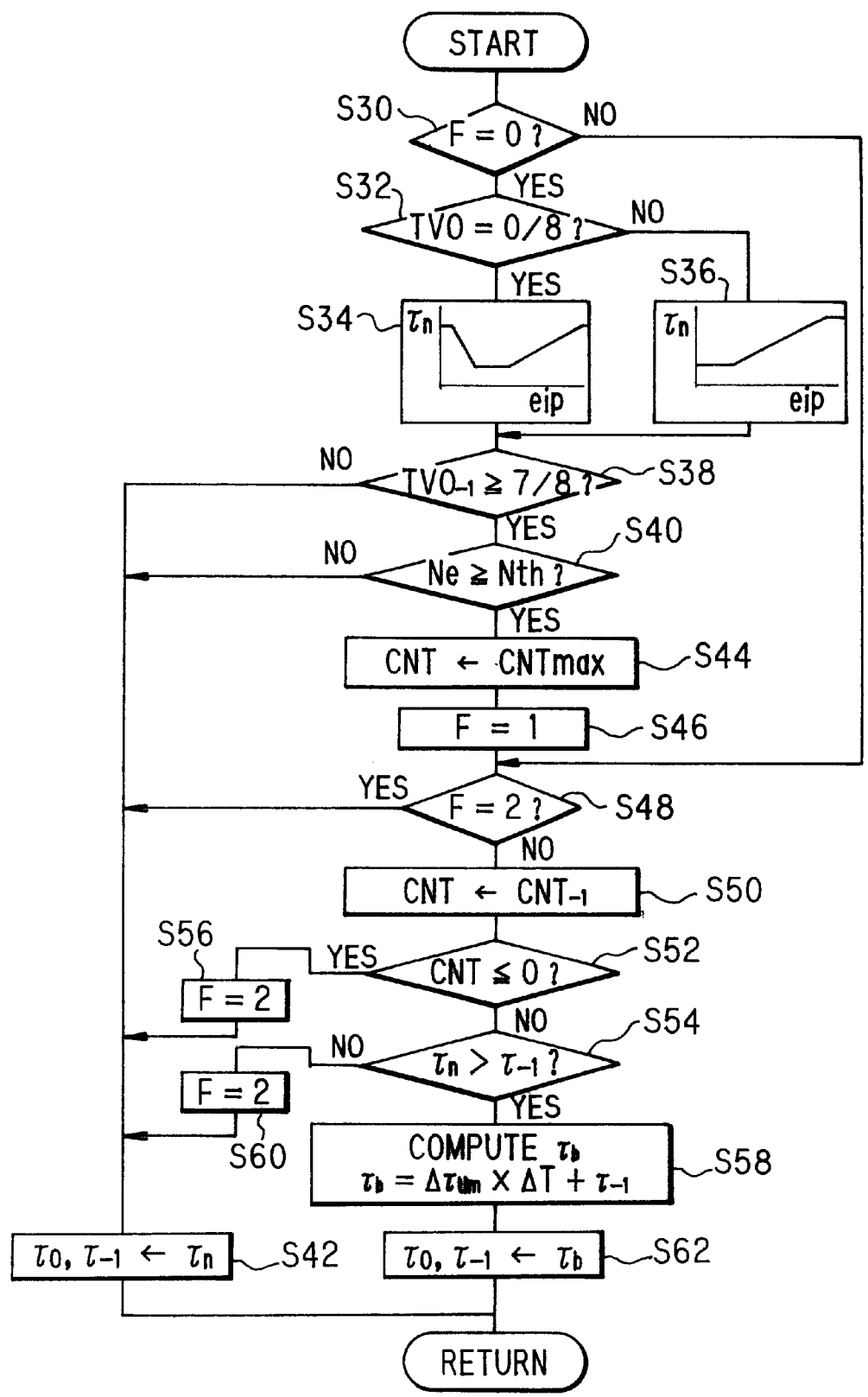
FIG. 5 is a flowchart describing a time constant setting process for upshift due to throttle opening decrease performed by the CVT control unit.

This flowchart is executed by the CVT control unit 300 instead of the flowchart shown in FIG. 5. In the flowchart of FIG. 10, the step S40 of FIG. 5 is omitted, and steps S70, S72, and S74 are added between the steps S38 and S44.

In the step S70, an input shaft rotation speed change rate $\Delta N_{pri}$ is computed from a deviation between the present value $N_{pri}$ of the input shaft rotation speed and the value $N_{pri-1}$ on the immediately preceding occasion. The input shaft rotation speed change rate $\Delta N_{pri}$ is computed by the following equation (3).

$$\Delta N_{pri} = (N_{pri} - N_{pri-1})/\Delta T \qquad (3)$$

Figure 11:
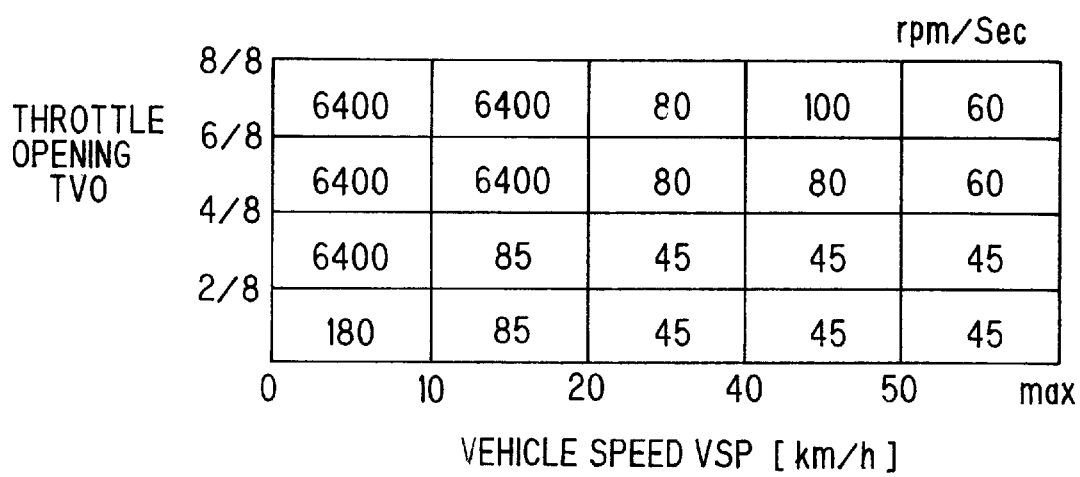
FIG. 11 is a map stored in the CVT control unit for computing a control value from the vehicle speed and the throttle opening.

In the step S72, a control value $M_n$ is computed from the present throttle opening TVO and vehicle speed VSP by referring to a map in FIG. 11. For example, if the present throttle opening TVO is 5/8 and the vehicle speed VSP is 40 km/h, the control value $M_n$ is 80 rpm/sec. The control value $M_n$ is set to increase with increases in the throttle opening TVO, and to increase with decreases in the vehicle speed VSP.

In the step S74, the input shaft rotation speed change rate $\Delta N_{pri}$ and the control value $M_n$ are compared, and if the change rate $\Delta N_{pri}$ is equal to or less than the control value $M_n$, the routine proceeds to the step S44, otherwise if the change rate $\Delta N_{pri}$ exceeds the control value $M_n$, the routine proceeds to the step S42.

Due to this, even when the driver's foot is slowly released from the accelerator pedal, this operation can be detected with high precision, and it can be determined whether or not to set the time constant $\tau_b$ which is smaller than $\tau_n$ immediately after the start of speed change.

Figure 12:
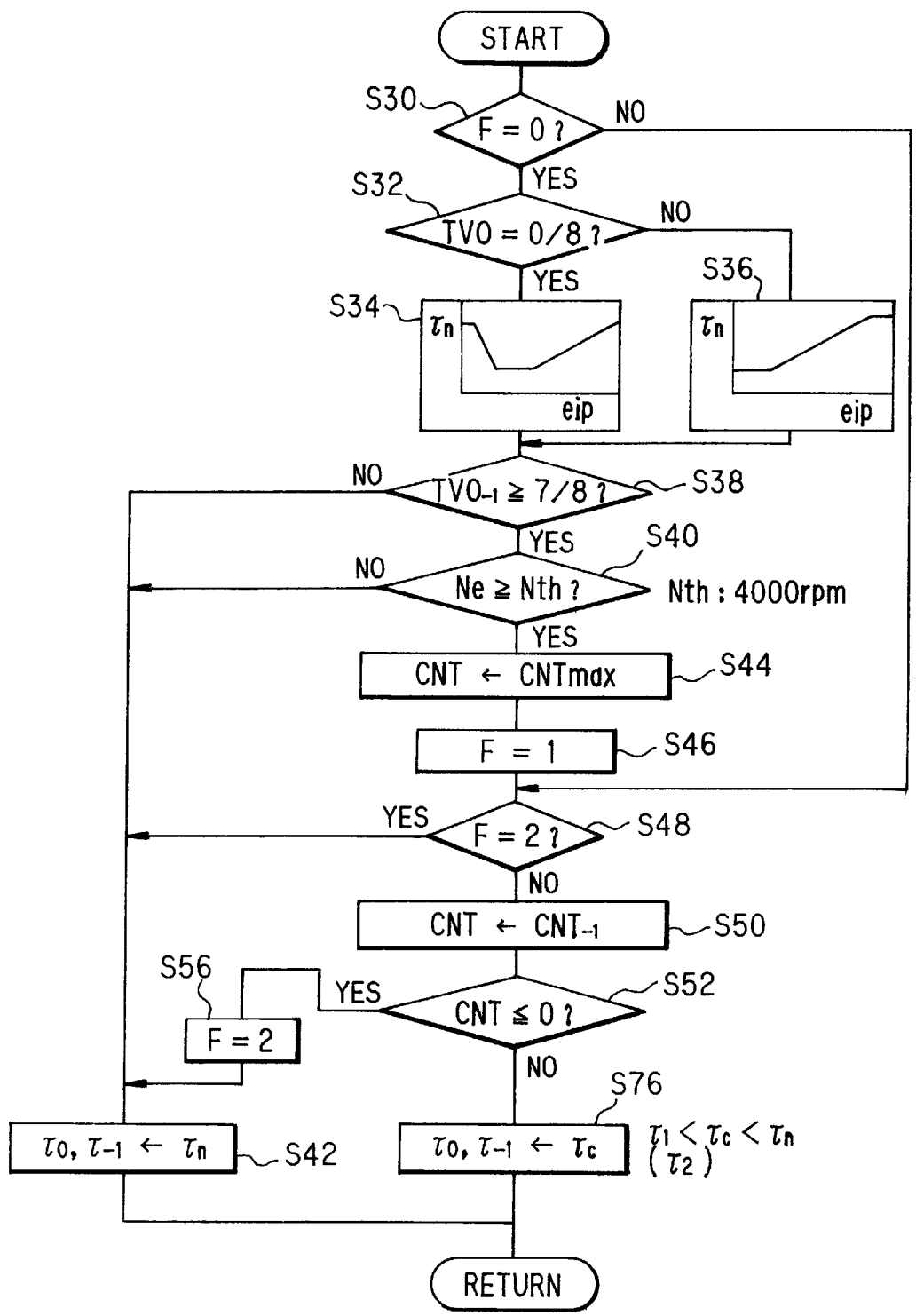
FIG. 12 is similar to FIG. 5, but showing a third embodiment of this invention.

FIG. 12 shows a third embodiment of this invention.

This flowchart is executed by the CVT control unit 300 instead of the flowchart shown in FIG. 5. In this flowchart of FIG. 12, the steps S54, S58, S60, S62 of FIG. 5 are omitted, and a step S76 is added after the step S52.

In the step S76, a time constant $\tau_C$ is set which is larger than the time constant $\tau_1$ for auto upshift and the time constant $\tau_2$ for downshift in FIG. 3, but smaller than the time constant $\tau_n$ which is set in the step S34 or the step S36 of FIG. 12.

While the control flag F is "1" and the control counter CNT does not become "0", i.e. for the predetermined time $CNT_{max}$ from the time $t_{01}$ when upshift starts due to throttle opening decrease, $\tau_C$ which is smaller than $\tau_n$ is set to the time constant $\tau_0$ and the command speed ratio $i_{pt}$ is computed.

At the time $t_{02}$ when the control counter CNT becomes "0", the routine proceeds from the step S52 to the step S56.

In the step S56, the control flag F is set to "2", and the routine proceeds to a step S42. Subsequently, the command speed ratio $i_{pt}$ is computed using the time constant $\tau_n$ which is larger value than $\tau_C$.

Hence, $\tau_C$ which is smaller than $\tau_n$ is set to the time constant $\tau_0$ immediately after upshift due to decrease of throttle opening starts, and the speed change response increases so that deceleration shock is suppressed.

After increasing the speed change response, $\tau_n$ is set to the time constant $\tau_0$ and the speed change response falls, so the driver also does not experience an acceleration shock or the like.

According to the above embodiment, when the throttle opening TVO is effectively fully open or the engine rotation speed $N_e$ is high, and the driver performs an accelerator pedal release or return so that upshift occurs, the time constant $\tau_0$ immediately after speed change begins is set to $\tau_b$ or $\tau_c$ which are smaller than $\tau_n$ so that the speed change response increases, and subsequently, the time constant $\tau_0$ is set to $\tau_n$ which is larger than $\tau_b$ or $\tau_c$ so that the speed change response falls.

However, various kinds of modifications are possible within the scope and spirit of the invention which is therefore not limited by these embodiments. For example, instead of varying the time constant, the speed change response itself may be varied, or the rotational speed of the drive pulley 16 varied. The depression amount of the accelerator pedal may also be used for the control instead of the throttle opening TVO.

Also, in the aforesaid embodiment, the CVT control unit 300 comprises the microcomputer 310, but an assembly of electronic circuits such as computing circuits may be used instead.

Further, the above embodiments were described in the context of their application to a belt type continuously variable transmission, but the same effect is obtained if they are applied to a toroidal type continuously variable transmission.

The embodiments of this invention in which an exclusive property or privilege is claimed are defined as follows:

What is claimed:

1. A controller for a continuously variable transmission of a vehicle which continuously varies a speed ratio comprising:

sensors for detecting a running state of said vehicle, where said running state includes a throttle opening of an engine with which said vehicle is provided and a microprocessor programmed to:
set a target speed ratio according to said running state, and
control a speed ratio of said transmission to be equal to said target speed ratio at a predetermined response rate, wherein said microprocessor is further programmed to:
distinguish between an upshift due to a throttle opening decrease and other upshifts,
set said response rate during said upshift due to said throttle opening decrease to be lower than a response rate during said other upshifts, and
set said response rate in a predetermined time from start of upshift due to said throttle opening decrease to be higher than a response rate after said predetermined time from start of upshift has elapsed.

2. A controller as defined in claim 1, wherein said microprocessor is further programmed to:
determine that said upshift due to said throttle opening decrease is performed when said throttle opening has decreased from a value which is larger than or equal to a predetermined value.

3. A controller as defined in claim 1, wherein said sensors comprise a sensor for detecting an engine rotation speed, and
said microprocessor is further programmed to:
determine that said upshift due to said throttle opening decrease is performed when said throttle opening has decreased from a value which is larger than or equal to a predetermined value and said engine rotation speed is larger than or equal to a predetermined value.

4. A controller as defined in claim 1, wherein said sensors further comprise a sensor for detecting an input shaft rotation speed of said transmission and a sensor for detecting a vehicle speed, and
said microprocessor is further programmed to:
determine a control value according to said throttle opening and vehicle speed, and
determine that said upshift due to said throttle opening decrease is performed when a variation rate of said input shaft rotation speed is less than said control value.

5. A controller as defined in claim 4, wherein said microprocessor is further programmed to increase said control value with increases in said throttle opening, and to increase said control value with decreases in said vehicle speed.

6. A controller for a continuously variable transmission of a vehicle which continuously varies a speed ratio, comprising:

sensors for detecting a running state of said vehicle, where said running state includes a throttle opening of an engine with which said vehicle is provided, and a microprocessor programmed to:
set a target speed ratio according to said running state, and
control a speed ratio of said transmission to be equal to said target speed ratio at a predetermined response rate, wherein said microprocessor is further programmed to:
distinguish between an upshift due to a throttle opening decrease and other upshifts,
set said response rate during said upshift due to said throttle opening decrease to be lower than a response rate during said other upshifts, and
set said response rate in a predetermined time from start of upshift due to said throttle opening decrease to be higher than a response rate after said predetermined time from start of upshift has elapsed, wherein said microprocessor is further programmed to:
compute a command speed ratio based on a target speed ratio and a predetermined time constant,
control said speed ratio of said transmission to be equal to said command speed ratio,
set said time constant to be larger during said upshift due to said throttle opening decrease than a time constant during other upshifts, and
set a time constant in a predetermined time from start of upshift due to said throttle opening decrease to be smaller than a time constant after said predetermined time from start of upshift has elapsed.

7. A controller for a continuously variable transmission of a vehicle which continuously varies a speed ratio, comprising:

sensors for detecting a running state of said vehicle, where said running state includes a throttle opening of an engine with which said vehicle is provided, and a microprocessor programmed to:
set a target speed ratio according to said running state, and
control a speed ratio of said transmission to be equal to said target speed ratio at a predetermined response rate, wherein said microprocessor is further programmed to:
distinguish between an upshift due to a throttle opening decrease and other upshifts,
set said response rate during said upshift due to said throttle opening decrease to be lower than a response rate during said other upshifts, and
set said response rate in a predetermined time from start of upshift due to said throttle opening decrease to be higher than a response rate after said predetermined time from start of upshift has elapsed, wherein said microprocessor is further programmed to:
compute a command speed ratio based on a target speed ratio and a predetermined to:
compute a command speed ratio based on a target speed ratio and a predetermined time constant,
control said speed ratio of said transmission to be equal to said command speed ratio,
set said time constant to be larger during said upshift due to said throttle opening decrease than a time constant during said other upshifts, and limit a variation amount of said time constant for predetermined time after start of speed change when a change-over is made to a time constant during said upshift due to said throttle opening decrease from a time constant during said other upshifts.

* * * * *